United States Patent
Liddell

(10) Patent No.: US 7,156,288 B2
(45) Date of Patent: Jan. 2, 2007

(54) LAMINATED DISC ENVELOPE WITH POSTCARD APPEARANCE

(75) Inventor: William James Gordon Liddell, Vancouver (CA)

(73) Assignee: DVP-Digital Video Postcards Inc., Vancouver (CA)

( * ) Notice: Subject to any disclaimer, the term of this patent is extended or adjusted under 35 U.S.C. 154(b) by 491 days.

(21) Appl. No.: 10/690,513

(22) Filed: Oct. 23, 2003

(65) Prior Publication Data

US 2005/0087589 A1    Apr. 28, 2005

(51) Int. Cl.
*B65D 27/34* (2006.01)
*B65D 27/04* (2006.01)
*B65D 27/22* (2006.01)
*B65D 85/30* (2006.01)

(52) U.S. Cl. .......... 229/313; 229/71; 229/84; 206/308.1

(58) Field of Classification Search ........ 206/308.1, 206/308.2, 311–312; 229/313, 84, 82, 92.8, 229/92.9, 71
See application file for complete search history.

(56) References Cited

U.S. PATENT DOCUMENTS

| | | | |
|---|---|---|---|
| 1,315,696 A * | 9/1919 | Alstrand ............... 229/72 |
| D262,891 S | 2/1982 | Nast | |
| 4,645,241 A | 2/1987 | Sfikas | |
| 4,727,988 A * | 3/1988 | Erickson ............... 229/313 |
| 5,048,681 A | 9/1991 | Henkel | |
| 5,101,973 A * | 4/1992 | Martinez ............... 206/308.1 |
| D327,638 S | 7/1992 | Denkin | |
| 5,422,875 A * | 6/1995 | Bribach ............... 720/726 |
| 5,460,265 A * | 10/1995 | Kiolbasa ............... 206/308.1 |
| 5,590,912 A | 1/1997 | Stevens | |
| 5,775,492 A | 7/1998 | Ban | |
| 5,857,565 A | 1/1999 | Baker et al. | |
| 6,279,817 B1 | 8/2001 | Flynn et al. | |
| 6,296,112 B1 * | 10/2001 | Pettey ............... 206/232 |

* cited by examiner

*Primary Examiner*—Jes F. Pascua
(74) *Attorney, Agent, or Firm*—Oyen Wiggs Green & Mutala LLP

(57) ABSTRACT

An envelope formed of top, bottom and center sheets. An aperture is cut in and intersects one end of the center sheet. The sheets are adhesively laminated to attach the center sheet's front surface to the top sheet's rear surface and attach the center sheet's rear surface to the bottom sheet's front surface. The aperture then forms an open-ended pocket between the top and bottom sheets. A flat article such as a compact disc can be slidably inserted into the pocket. A closure flap formed on an end of the bottom sheet adjacent the pocket opening is then folded over the opening and adhesively attached to the top sheet's front surface. The envelope is opened by severing a perforated tear strip which extends across the closure flap, between the closure flap's attachment to the top sheet and the closure flap's foldable junction with the bottom sheet.

20 Claims, 2 Drawing Sheets

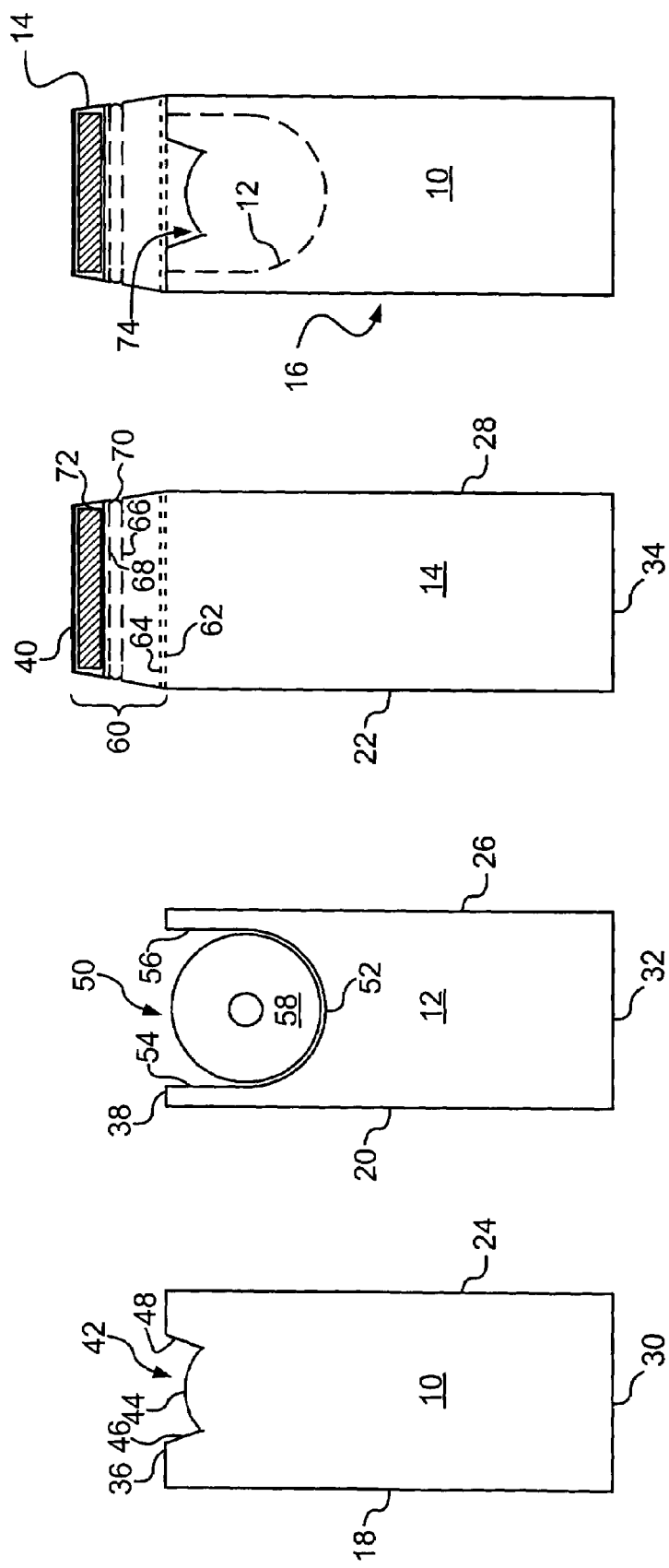

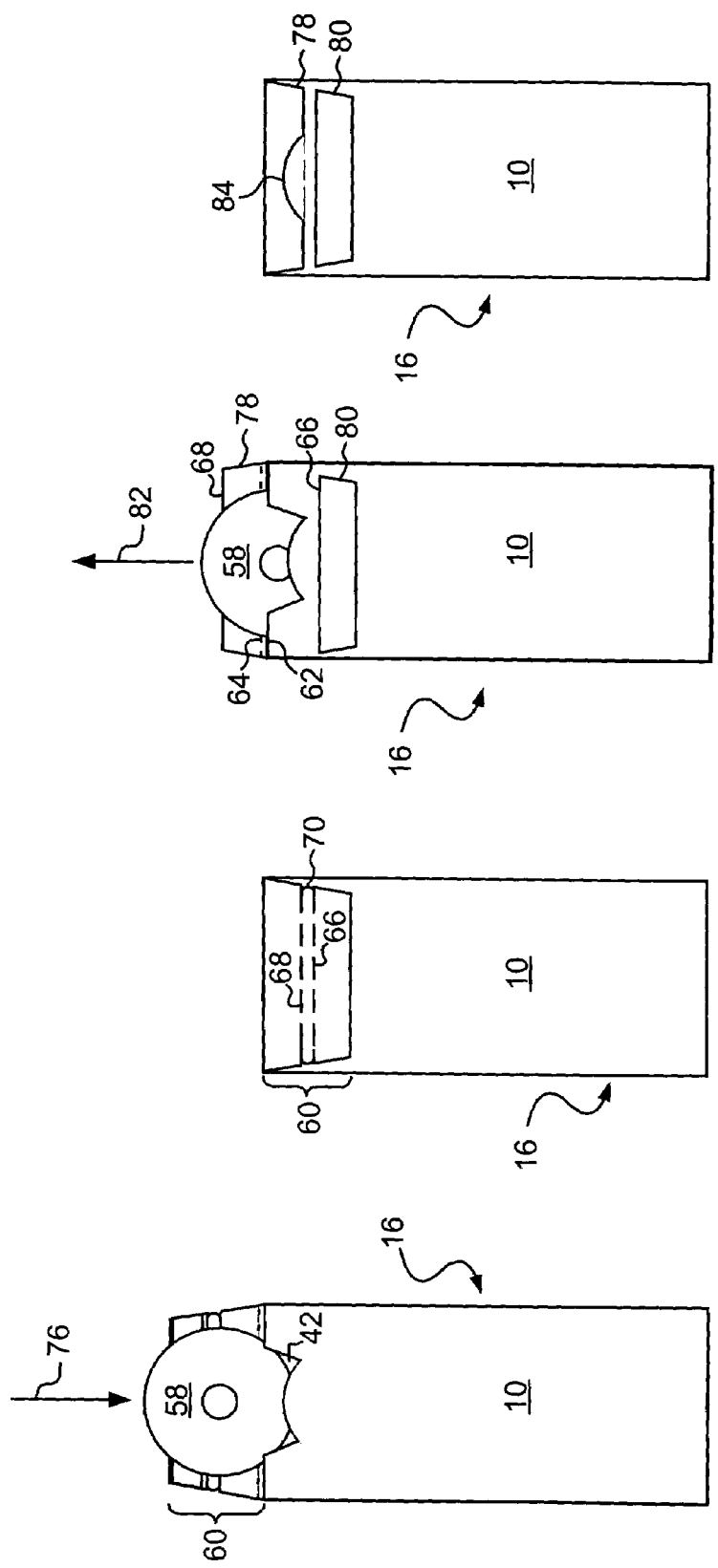

US 7,156,288 B2

LAMINATED DISC ENVELOPE WITH POSTCARD APPEARANCE

TECHNICAL FIELD

This invention provides an envelope for packaging, mailing or displaying flat articles such as DVDs, compact discs or credit cards. The envelope's laminated construction minimizes bulky edge flaps, giving the envelope an attractive stiff, slim, postcard-like appearance.

BACKGROUND

A variety of envelopes have been developed for use in mailing flat articles such as DVDs, compact discs, credit cards, keys, etc. Such envelopes are typically made by die-cutting a single cardboard or paperboard blank, which is then folded to form the envelope. Such envelopes tend to be bulky and unattractive. Consequently, they are not well suited to use as retail display packages or as attractive mailers for flat articles. This invention addresses those shortcomings.

SUMMARY OF INVENTION

The invention provides an envelope formed of top, bottom and center sheets. An aperture is cut in and intersects one end of the center sheet. The sheets are adhesively laminated to attach the center sheet's front surface to the top sheet's rear surface and attach the center sheet's rear surface to the bottom sheet's front surface. When the sheets are adhesively laminated the aperture forms an open-ended pocket between the top and bottom sheets. A flat article such as a compact disc, DVD, credit card, key, booklet, etc. can be slidably inserted into the pocket. A closure flap formed on an end of the bottom sheet adjacent the apertured end of the center sheet can then be folded over the pocket's opening and adhesively attached to the top sheet's front surface.

The envelope is opened by severing a perforated tear strip which extends across the closure flap, between the portion of the closure flap adhesively attached to the top sheet and the closure flap's foldable junction with the bottom sheet.

A second aperture is advantageously cut in and intersects one end of the top sheet. The top sheet's apertured end is placed adjacent the center sheet's apertured end before the sheets are adhesively laminated to one another. The second aperture allows a user to touch an article located in the pocket to slidably extract the article from the pocket or slidably reinsert the article into the pocket. The second aperture's base can be shaped to form a reclosure flap which projects above the tear strip when the closure flap is folded against the top sheet. After the tear strip has been removed, a portion of the closure flap remains foldably attached to the bottom sheet. The envelope can be reclosed by tucking that portion beneath the reclosure flap.

BRIEF DESCRIPTION OF DRAWINGS

FIG. 1 is a front elevation view of the top sheet of a laminated envelope in accordance with the invention.

FIG. 2 is a front elevation view of the center sheet of a laminated envelope in accordance with the invention, showing an article positioned relative to an aperture cut in the center sheet.

FIG. 3 is a front elevation view of the bottom sheet of a laminated envelope in accordance with the invention.

FIG. 4 is a front elevation view of a laminated envelope incorporating the FIG. 1, 2 and 3 sheets in accordance with the invention.

FIG. 5 is a front elevation view of the FIG. 4 laminated envelope, showing an article positioned for insertion into the envelope.

FIG. 6 is a front elevation view of the FIG. 5 laminated envelope, after insertion of the article and sealing of the closure flap.

FIG. 7 is a front elevation view of the FIG. 6 laminated envelope after removal of the tear strip to open the envelope, and showing partial withdrawal of the article from the envelope.

FIG. 8 is a front elevation view of the FIG. 7 laminated envelope, after closure of the reclosure flap.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

FIGS. 1, 2 and 3 respectively depict separate die-cut sheet portions 10, 12, 14 of laminated envelope 16, which is shown assembled in FIG. 4. Specifically, FIG. 1 depicts top sheet 10's front surface, FIG. 2 depicts center sheet 12's front surface, and FIG. 3 depicts bottom sheet 14's front surface. Sheets 10, 12, 14 each have a similar substantially planar, generally rectangular shape. More particularly, sheets 10, 12, 14 have straight, equal-length left sides 18, 20, 22; straight, equal-length right sides 24, 26, 28 which are substantially parallel to left sides 18, 20, 22 respectively; and straight, equal-length bottom sides 30, 32, 34 which are substantially perpendicular to left sides 18, 20, 22 respectively and substantially perpendicular to right sides 24, 26, 28 respectively.

Top sheet 10's top side 36 is die-cut to form an aperture 42 having a concave base 44 with inwardly and downwardly tapered sides 46, 48. Center sheet 12's top side 38 is die-cut to form an aperture 50 having a convex base 52 and substantially parallel sides 54, 56. Aperture 50 is sized and shaped to accommodate an article 58 such as a DVD, CD or other digital data disc. The thickness dimension of the material used to form center sheet 12 is preferably slightly greater than article 58's thickness dimension—thickness being measured between center sheet 12's front and rear surfaces.

Bottom sheet 14 has greater length (i.e. between bottom and top sides 34, 40) than top sheet 10 and center sheet 12. This greater-length projecting portion of bottom sheet 14 is die-cut, perforated and scored to form closure flap 60. Specifically, at least one and preferably a pair of closely-spaced, substantially parallel lines 62, 64 are scored on bottom sheet 14 at the top ends of and substantially perpendicular to left and right sides 22, 28. The displacement between bottom side 34 and lower score line 62 is substantially equal to the displacement between top sheet 10's bottom and top sides 30, 36 which is in turn substantially equal to the displacement between center sheet 12's bottom and top sides 32, 38. A pair of closely-spaced, substantially parallel perforations 66, 68 are formed on closure flap 60, substantially perpendicular to left and right sides 22, 28. Perforations 66, 68 define a tear strip 70. A suitable adhesive is applied to closure flap 60's front surface (i.e. the surface which is visible in FIG. 3), between top (distal) side 40 and top perforation 68, to form adhesive strip 72. Closure flap 60's left and right sides are tapered inwardly and upwardly.

A suitable adhesive is applied to substantially cover center sheet 12's front and rear surfaces. Top sheet 10's rear surface is then aligned over center sheet 12's front surface, placing left sides 18, 20; right sides 24, 26; and bottom sides 30, 32 respectively adjacent and coextensive with one another. Bottom sheet 14's front surface is similarly aligned beneath center sheet 12's rear surface, placing left sides 20, 22; right sides 26, 28; and bottom sides 32, 34 respectively adjacent and coextensive with one another. The aligned sheets 10, 12, 14 are then compressed between a pair of parallel platens (not shown), sealing the sheets together to form envelope 16 with center sheet 12's aperture 50 forming an open-ended pocket 74 between the rear surface of top sheet 10 and the front surface of bottom sheet 14. After sheets 10, 12, 14 are laminated together, envelope 16's left, right and bottom sides can be trimmed to give them a sharp, finished look. The sides can also be trimmed to give envelope 16 any desired size or shape, provided the trimming operation leaves sufficient material to form closure flap 60 and allow lamination of sheets 10, 12, 14 without encroaching upon aperture 50 or pocket 74.

After envelope 16 is formed as aforesaid, article 58 can be slidably inserted into pocket 74 as indicated by arrow 76 (FIG. 5). Closure flap 60 is then folded forwardly and downwardly along score lines 62, 64 into the position shown in FIG. 6, bringing closure flap 60's adhesive strip 72 into contact with top sheet 10's front surface, beneath top sheet 10's aperture 42. Application of a light compressive force between closure flap 60 and the adjacent rear surface portion of bottom sheet 14 then seals closure flap 60 to top sheet 10's front surface, entrapping article 58 within pocket 74. Envelope 16 containing article 58 is now ready for shipment, mailing or display.

An end user can easily retrieve article 58 from within envelope 16 by grasping and pulling tear strip 70 to sever it from closure flap 60 along perforations 66, 68. This frees closure flap 60's reclosure flap 78, allowing reclosure flap 78 to be folded upwardly and rearwardly along score lines 62, 64 into the position shown in FIG. 7. Portion 80 of closure flap 60 remains adhesively attached to top sheet 10's front surface. Article 58 can now be slidably withdrawn from pocket 74, as indicated by arrow 82. If desired, article 58 can subsequently be reinserted into pocket 74. The edge of reclosure flap 78 defined by perforation 68 can then be tucked beneath reclosure tab 84 (FIG. 8) formed by aperture 42's base 44.

As will be apparent to those skilled in the art in the light of the foregoing disclosure, many alterations and modifications are possible in the practice of this invention without departing from the spirit or scope thereof. For example, aperture 50 and pocket 74 can be configured to accommodate a wide variety of articles, such as compact discs or DVDs of different sizes, credit cards, keys, booklets, or other similarly flat articles. Aperture 50 and pocket 74 are preferably only slightly larger than article 58, to minimize movement of article 58 within pocket 74.

Top sheet 10's aperture 42 is a convenient aid to removal of article 58 from pocket 74, but aperture 42 need not be provided. If aperture 42 is not provided, article 58 can be retrieved from within envelope 16, after reclosure flap 78 is opened, by inverting envelope 16 and lightly shaking it to slidably dislodge article 58 from pocket 74. The size and shape of aperture 42, if provided, is relatively arbitrary—aperture 42 should be sufficiently large to allow a user to touch article 58 with one or two fingers when closure flap 60 (or reclosure flap 78) is open, but not so large that adhesive strip 72 overlaps aperture 42 when closure flap 60 is closed. Aperture 42 should be sufficiently small that it will be covered when closure flap 60 (or reclosure flap 78) is closed. Aperture 42's base 44 need not be concave—any base shape forming an upwardly projecting reclosure tab 84 will suffice.

Center sheet 12 can be formed of any suitably stiff material such as paperboard, plastic, foam core, etc. Top and bottom sheets 10, 14 can be formed of thinner material than center sheet 12. Paperboard, plastic, foil or the like are suitable materials for forming top and bottom sheets 10, 14. Alternatively, sheets 10 or 14 can be made of a transparent plastic material to facilitate viewing of either or both sides of article 58 while it is contained within envelope 16. Either or both sides of center sheet 12 can be pre-printed with text, graphics, photographs, etc. for display through such transparent top or bottom sheets. If article 58 bears text, graphics, photographs, etc. then suitably coordinated text, graphics, photographs, etc. can be pre-printed on center sheet 12, such that article 58 (while contained within envelope 16 in suitable alignment with center sheet 12) and center sheet 12 together provide a unitary postcard-type scene, text message, etc. Alternatively, text, graphics, photographs, etc. can be pre-printed on either or both of top and bottom sheets 10, 14.

Reclosure flap 78 is not essential and can be eliminated. As an alternative, if it is desired to provide envelope 16 with a reclosure capability, a suitable resealable adhesive can be provided on adhesive strip 72 to facilitate repeated opening and closing of closure flap 60.

Instead of having the above-described and illustrated generally rectangular shape, sheets 10, 12, 14 may have any other desired external shape to suit advertising, packaging, display or other purposes. Thus, sheets 10, 12, 14 need not have the above-described and illustrated straight, equal-length left sides 18, 20, 22; or the above-described and illustrated straight, equal-length right sides 24, 26, 28 which are substantially parallel to left sides 18, 20, 22 respectively; or the above-described and illustrated straight, equal-length bottom sides 30, 32, 34 which are substantially perpendicular to left sides 18, 20, 22 respectively and substantially perpendicular to right sides 24, 26, 28 respectively.

What is claimed is:

1. An envelope, comprising:
   (a) top sheet having front and rear surfaces;
   (b) a bottom sheet having front and rear surfaces;
   (c) a center sheet having:
      (i) a front surface adhesively attached to the top sheet's rear surface;
      (ii) a rear surface adhesively attached to the bottom sheet's front surface;
      (iii) a first aperture in and intersecting one end of the center sheet, the first aperture forming an open-ended pocket between the top sheet's rear surface and the bottom sheet's front surface;
   (d) a closure flap formed on an end of the bottom sheet adjacent the one end of the center sheet;
   (e) an adhesive strip on a front surface of the closure flap;
   (f) a tear strip on the closure flap; and
   (g) a second aperture in and intersecting an end of the top sheet adjacent the one end of the center sheet, the second aperture having a base shaped to form a reclosure flap projecting above the tear strip when the closure flap's front surface is folded against the top sheet's front surface.

2. An envelope as defined in claim 1, the tear strip further comprising a pair of spaced perforations extending across the closure flap.

3. An envelope as defined in claim 1, the tear strip further comprising a pair of spaced perforations extending across the closure flap substantially parallel to the one end of the center sheet.

4. An envelope as defined in claim 1, wherein the adhesive strip is between the tear strip and a distal end of the closure flap.

5. An envelope as defined in claim 1, wherein the adhesive strip further comprises a resealable adhesive.

6. An envelope as defined in claim 1, the closure flap further comprising at least one score line formed adjacent and substantially parallel to the one end of the center sheet.

7. An envelope as defined in claim 1, the closure flap further comprising a pair of closely-spaced score lines formed adjacent and substantially parallel to the one end of the center sheet.

8. An envelope as defined in claim 1, wherein the pocket is slightly larger than a preselected article to be stored in the pocket.

9. An envelope as defined in claim 1, wherein the top, bottom and center sheets are formed of paperboard.

10. An envelope as defined in claim 1, wherein the center sheet is formed of paperboard and the top and bottom sheets are formed of a transparent material.

11. A method of making an envelope, comprising:
   (a) providing a top sheet having front and rear surfaces;
   (b) providing a bottom sheet having front and rear surfaces;
   (c) providing a center sheet having front and rear surfaces;
   (d) forming a closure flap at and projecting from one end of the bottom sheet;
   (e) providing an adhesive strip on a front surface of the closure flap;
   (f) forming a tear strip in the closure flap;
   (g) cutting a first aperture in and intersecting one end of the center sheet, the first aperture forming an open-ended pocket between the top sheet's rear surface and the bottom sheet's front surface;
   (h) cutting a second aperture in and intersecting one end of the top sheet;
   (i) shaping a base portion of the second aperture to form a reclosure flap projecting above the tear strip when the closure flap's front surface is folded against the top sheet's front surface;
   (i) applying adhesive to the center sheet's front and rear surfaces;
   (j) placing the bottom and center sheets together with the one end of the bottom sheet adjacent the one end of the center sheet and with the bottom sheet's front surface against the center sheet's rear surface; and
   (k) placing the top and center sheets together with the center sheet's front surface against the top sheet's rear surface and with the one end of the top sheet adjacent the one end of the center sheet.

12. A method as defined in claim 11, further comprising forming the tear strip by perforating the closure flap.

13. A method as defined in claim 11, further comprising forming the tear strip by perforating the closure flap along a pair of spaced lines extending across the closure flap substantially parallel to the one end of the center sheet.

14. A method as defined in claim 11, wherein the adhesive strip further comprises a resealable adhesive strip.

15. A method as defined in claim 11, further comprising providing the adhesive strip between the tear strip and a distal end of the closure flap.

16. A method as defined in claim 11, further comprising scoring the closure flap along a line adjacent and substantially parallel to the one end of the center sheet.

17. A method as defined in claim 11, further comprising scoring the closure flap along a pair of closely-spaced lines adjacent and substantially parallel to the one end of the center sheet.

18. A method as defined in claim 11, further comprising sizing the first aperture slightly larger than a preselected article to be stored in the pocket.

19. A method as defined in claim 11, further comprising forming the top, bottom and center sheets of paperboard.

20. A method as defined in claim 11, further comprising forming the center sheet of paperboard and forming the top and bottom sheets of a transparent material.

* * * * *